United States Patent [19]
Bruce et al.

[11] Patent Number: 5,116,671
[45] Date of Patent: May 26, 1992

[54] GYPSUM BOARD

[75] Inventors: Robert Bruce, Brantford; Dimitrios Mitakidis, Oakville, both of Canada

[73] Assignee: Domtar, Inc., Montreal, Canada

[21] Appl. No.: 711,710

[22] Filed: Jun. 7, 1991

Related U.S. Application Data

[63] Continuation of Ser. No. 463,637, Jan. 11, 1990, abandoned, which is a continuation-in-part of Ser. No. 311,908, Feb. 17, 1989, Pat. No. 5,085,929.

[51] Int. Cl.$^5$ .......................... B32B 13/00; B32B 5/14
[52] U.S. Cl. ............................. 428/309.9; 428/310.5; 428/312.4; 428/314.4; 428/314.8; 428/703
[58] Field of Search .............. 428/309.9, 310.5, 312.2, 428/312.4, 314.4, 314.8, 318.6, 318.8, 703

[56] References Cited

U.S. PATENT DOCUMENTS

| | | | |
|---|---|---|---|
| 3,516,882 | 6/1970 | Cummisford | 428/312.4 |
| 4,156,615 | 5/1979 | Cukier | 106/111 |
| 4,288,263 | 9/1981 | Delcoigne et al. | 428/703 |
| 4,298,394 | 11/1981 | Leeming et al. | 106/111 |
| 4,327,146 | 4/1982 | White | 428/312.4 |
| 4,351,867 | 9/1982 | Mulvey et al. | 428/312.4 |
| 4,618,370 | 10/1986 | Green et al. | 106/111 |

FOREIGN PATENT DOCUMENTS 772581  4/1957  United Kingdom ............ 428/312.4

*Primary Examiner*—William J. Van Balen
*Attorney, Agent, or Firm*—Griffin, Branigan & Butler

[57] ABSTRACT

In the improved gypsum board in accordance with this invention, the board has a gypsum core and first and second cover sheets of fibrous material on opposing faces. The core has a first stratum parallel to and adjacent the first cover sheet. This stratum does not contain any fibers of the fibrous material. This first stratum has relatively few voids and a substantially greater density than the central portion of the core of the board. The central portion of the core has a plurality of relatively large discrete voids substantially uniformly distributed throughout the central portion of the core. These voids have substantially spherical coherent walls.

13 Claims, 10 Drawing Sheets

FIGURE 2

| PRODUCT: | | STRATUM 1 | STRATUM 3 | CENTRE THICKNESS/SPECIFIC GRAVITY | | STRATUM 2 |
|---|---|---|---|---|---|---|
| #1 | 1<br>2 | 0.768<br>0.797 | 0.635<br>0.677 | .333<br>.333 | 0.645<br>0.645 | 0.641<br>0.677 |
| #2 | 1<br>2 | 0.876<br>0.862 | 0.602<br>0.644 | .328<br>.324 | 0.662<br>0.670 | 0.597<br>0.644 |
| #3 | 1<br>2 | 0.718<br>0.764 | 0.736<br>0.675 | .315<br>.315 | 0.657<br>0.653 | 0.824<br>0.726 |
| #4 | 1<br>2 | 0.844<br>0.863 | 0.715<br>0.726 | .308<br>.311 | 0.672<br>0.671 | 0.811<br>0.749 |
| #5 | 1<br>2 | 0.729<br>0.692 | 0.753<br>0.710 | .312<br>.313 | 0.702<br>0.713 | 0.781<br>0.669 |
| #6 | 1<br>2 | 0.661<br>0.708 | 0.666<br>0.641 | .329<br>.329 | 0.607<br>0.608 | 0.660<br>0.680 |
| #7 | 1 | 0.545 | 0.869 | .319 | 0.664 | 0.539 |
| Control Sample 7.0 lbs/cu.ft | | 0.843 | 0.673 | .319 | 0.662 | 0.906 |
| NEW PRODUCT 10.4 lbs/cu.ft | | 0.984 | 0.716 | .316 | 0.672 | 0.963 |
| 13.0 lbs/cu.ft | | 1.343 | 1.062 | .316 | 0.693 | 1.242 |
| 14.5 lbs/cu.ft | | 1.270 | 1.102 | .311 | 0.688 | 1.210 |

| FOAM DENSITY lbs/ft³ | AVERAGE CORE DENSITY TO 0.005 BELOW PAPER INTERFACE G/cm³ | | MAIL PULL RESISTANCE LBF | HUMIDIFIED BOND | | COMPRESSIVE STRENGTH SLURRY PSI | HUNTER HARDNESS FIELD LBF | COMPRESSIVE STRENGTH BOARD PSI | | FLEXURAL STRENGTH LBF | CORE BUBBLE POPULATION NO./in² | CALCULATED BOARD WEIGHT lbs/NSF |
|---|---|---|---|---|---|---|---|---|---|---|---|---|
| | IVORY | GREY | | LBF | %FAIL | | | FACE UP | FACE DOWN | | | |
| 7.0 | 0.843 | 0.906 | 98 | 15 | 74 | 680 | 16 | 575 | 579 | 54/59 176/166 | 7,040 | 1,698 |
| 10.4 | 0.984 | 0.963 | 103 | 18 | 46 | 716 | 18 | 598 | 623 | 54/53 170/156 | 6,400 | 1,710 |
| 13.0 | 1.343 | 1.242 | 112 | 20 | 0 | 707 | 18 | 695 | 653 | 54/51 174/161 | | 1,751 |
| 14.5 | 1.270 | 1.210 | 119 | 20 | 0 | 760 | 19 | 670 | 675 | 54/53 163/161 | 3,200 | 1,728 |

FIG. 9

GYPSUM BOARD CORE SPECIFIC GRAVITY PROFILE

GYPSUM BOARD CORE SPECIFIC GRAVITY PROFILE
10.4 lbs/cu.ft

GYPSUM BOARD CORE SPECIFIC GRAVITY PROFILE
14.5 lbs/cu.ft

GYPSUM BOARD CORE SPECIFIC GRAVITY PROFILE
13 lbs/cu.ft

GYPSUM BOARD CORE SPECIFIC GRAVITY PROFILE
11.7 lbs/cu.ft

GYPSUM BOARD CORE SPECIFIC GRAVITY PROFILE
8.9 lbs/cu.ft

GYPSUM BOARD CORE SPECIFIC GRAVITY PROFILE
13 lbs/cu.ft

GYPSUM BOARD

This application is a continuation of application Ser. No. 07/463,637 filed on Jan. 11, 1990, now abandoned, which application is in turn a continuation-in-part application of Ser. No. 07/311,908, filed on Feb. 17, 1989, now U.S. Pat. No. 5,085,929, issued on Feb. 4, 1992.

This invention relates to an improved gypsum board and particularly to a gypsum board having an increased density stratum at the portion of the core near the gypsum paper interface.

Typically, in the manufacture of gypsum board a pregenerated foam is added to the board core slurry mix to decrease the weight of the gypsum board. This foam is generated from a mixture of a liquid foaming agent, air and water in a suitable foam generating apparatus. The foamed core slurry is then deposited upon a moving paper substrate which, itself, is supported on a long moving belt. A second paper substrate is then applied on top of the slurry to constitute the second face of the gypsum board and the sandwich passes through a forming station which determines the width and thickness of the gypsum board. In such a continuous operation the core slurry begins to set immediately after forming. When sufficient setting has occurred the board is cut into commercially acceptable lengths, typically eight feet, and then passed into a board dryer. Thereafter the board is trimmed to length, bundled in pairs and stored prior to sale.

Those familiar with the manufacture of gypsum board will be familiar with the various kinds of product quality failures which are typically experienced within the industry. One of these types of failure is known as a "splitter". In a "splitter" type of failure the paper forming one of the faces of the board is easily separated from the board when the board is cut, normally during board application in very humid conditions. In the "splitter" failure, when the paper facing separates from the board it takes with it a portion of the set gypsum. There is no paper remaining on the core of the board after failure and there is a layer of gypsum on the face of the paper. A second type of failure which can be experienced is known in the trade as a "peeler". In this type of failure there is little or no gypsum adhered to the paper and no paper is left on the gypsum panel after failure.

Heretofore many efforts have been made to enhance the so-called paper/gypsum "bond". Typical of efforts to enhance the paper/gypsum "bond" are those set out in U.S. Pat. No. 4,327,146 which issued Apr. 27, 1982. This patent teaches the method of manufacture of gypsum board in which there is theoretically obtained a better growth of gypsum crystals into the interstices of paper and thus it is felt an enhanced paper/gypsum "bond" is obtained.

Quite surprisingly we have discovered that the major plane of weakness which effects so-called "splitter" failures is not the "bond" between the paper and the gypsum crystals but rather the strength of the core itself in the stratum adjacent to the paper. Vastly improved gypsum board may be obtained by enhancing the strength of this stratum adjacent to the paper. In particular, the stratum which may most advantageously enhance the quality of the gypsum board is that narrow stratum which is immediately adjacent to the paper but which does not contain any of the paper fibres.

As is typical in the manufacture of gypsum board today, the core, at least in the central region, advantageously contains a number of voids which reduce the density of the core and thus the weight of the board for a given thickness. Previously it has been thought that the best results can be obtained by ensuring that the core comprises as many voids as possible. It has previously been thought that such voids should be of as small a nature as possible. To this end heretofore, the products which are used as foaming agents are used in such a manner as to create as many bubbles in the foam as possible when passed through a foam generator. It is desired and expected that these bubbles will exist when the pregenerated foam is mixed with the core slurry and that the bubbles in the foam will then lead to small evenly distributed voids in the set gypsum.

Rather surprisingly, we have found that the resulting gypsum board can be significantly strengthened by the creation of larger voids in the set gypsum than has been the practice heretofore. We have found that the creation of voids of a substantially spherical configuration provides an enhanced gypsum board. Preferably the voids are coherent, that is to say, each individual void is intact and does not extend substantially into adjacent voids We have also noted that an improved product results when the voids are spaced one from another and the resultant core thus comprises a plurality of such substantially spherical voids with the gypsum between voids being substantially solid, that is to say, without significant voids. The term "discrete" is used in this disclosure and claims to describe this structure.

In the improved gypsum board in accordance with this invention, the board has a gypsum core and first and second cover sheets of fibrous material on opposing faces. The core has a first stratum parallel to and adjacent the first cover sheet. This stratum does not contain any fibers of the fibrous material. This first stratum has relatively few voids and a substantially greater density than the central portion of the core of the board. The central portion of the core has a plurality of relatively large discrete voids substantially uniformly distributed throughout the central portion of the core. These voids have substantially spherical coherent walls.

The improved board of this invention may be made by a process in which foam is generated from a foam concentrate mixed with at least 35% of the total water required to create a foam water mixture having a density of at least 10 lbs per cubic foot. This foam is mixed with calcined gypsum, the remainder of the water and any desirable additives in a slurry mixer. The mixed slurry is deposited onto a sheet of paper and another sheet of paper is laid on top to enclose the board core which is then allowed to set and dried.

The invention may be better understood from reference to the following description and drawings which illustrate a preferred embodiment of the invention, and in which:

FIG. 2 is a table showing specific gravity of various strata of the improved board and compared to existing commercial products.

FIG. 3 is a scanning electron microscope photograph of the improved board.

FIG. 9 is a table of characteristics of a sample of improved board.

Figure 1:
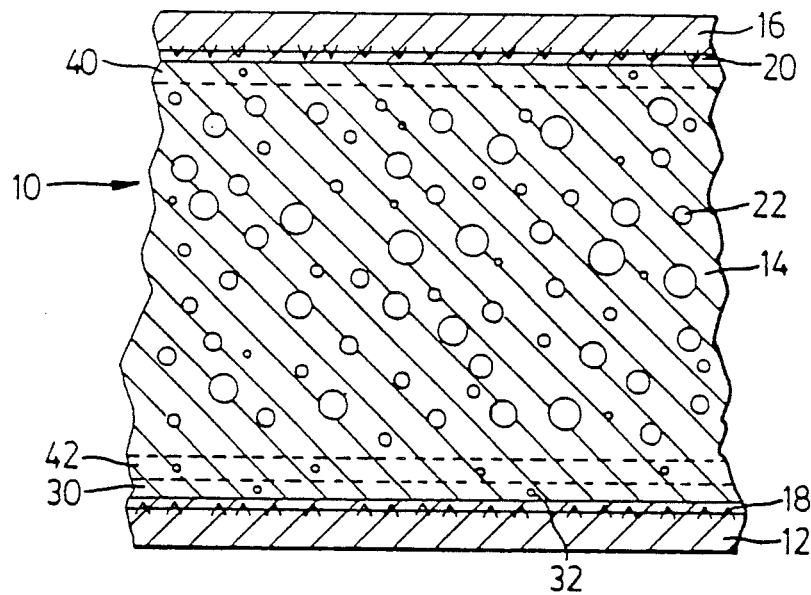
FIG. 1 is a drawing of a cross-section through the improved gypsum board.

FIG. 1 illustrates a portion of a transverse section taken through the improved board. This type of section is typically made through gypsum board by scoring through one paper face and snapping or breaking the board. This gives a substantially planar surface. In this specification the term "scoring and snapping" is used to describe the method of creating this plane. The drawing is not to scale but illustrates the significant features of the improved board. The board 10 comprises a first paper surface 12, a set gypsum core indicated generally as 14 and a second paper surface 16. Typically in the manufacture of such board the core slurry is deposited upon the first paper surface 12 and thereafter the second paper 16 is applied on top of the core slurry. As will be well understood by those familiar with this art the gypsum board may be passed through press rolls or other forming devices to establish the thickness of the board. The board is usually made in a ribbon about 4 feet wide. After initial setting the board is cut into lengths and dried. In such a board the gypsum crystals at the surfaces of the core extend into the interstices in the paper. There is a layer of interlinked gypsum crystals and paper fibres which is indicated adjacent paper surface 12 by the layer identified as 18. There is similarly a layer of interlinked gypsum crystals and paper fibres adjacent paper surface 16, identified by the numeral 20.

The central portion of the core 14 comprises set gypsum and contains a plurality of randomly located but substantially evenly spaced voids. The voids identified typically by the numeral 22 are substantially spherical. As the voids are located randomly throughout the set gypsum the apparent diameter in the plane illustrated will vary. Where the plane passes through the diameter of a void, the true size of the void is shown in FIG. 1. Where the void is displaced from the plane then the size of the void would appear different simply from its location in front of or behind the plane. The voids themselves however also vary in size.

In the improved board according to this invention the voids are considerably larger than have been utilized heretofore. It will be observed that in FIG. 1 the voids are shown as being substantially coherent. The voids do not extend for the most part into adjacent voids. In addition, it is observed from FIG. 1 that the spaces between the voids do not contain substantial numbers of voids of smaller size. Rather the space between the voids is substantially solid set gypsum. In this disclosure and claims the term discrete is used to describe this solid structure between the voids.

In FIG. 1 there is shown a first stratum 30 which is adjacent to the first paper layer 12. The stratum 30 as shown is approximately 0.005" in thickness. The stratum is located parallel to and adjacent to the paper surface 12. The stratum 30, however, does not contain any fibers from the paper surface 12 and thus does not include any of the layer identified as 18 in FIG. 1. This first stratum 30 does not contain any substantial number of voids. As shown in FIG. 1, there may be small voids such as that identified by the numeral 32. However, for the most part, the first stratum 30 comprises a layer of substantially solid gypsum. As the first stratum 30 does not contain any substantial number of voids it will have a significantly higher average density than the density of the central portion of the core 14.

There is a second stratum 40 located adjacent the paper surface 16. Second stratum 40 is adjacent to and parallel to the paper surface 16 but does not include any fibers from the paper surface 16. The stratum 40 is also approximately 0.005" in thickness. This second stratum also contains substantially no voids and thus has a significantly higher average density than the central portion of the core 14.

Preferably there is a third stratum 42 adjacent to and parallel to first stratum 30. The stratum 42 is also approximately 0.005" in thickness and contains a few more voids than are contained in the first stratum but significantly less voids than are present in the central portion of the core 14.

In one method of analysing the improved board of this invention and the existing boards manufactured by ourselves and various competitive boards, the following approach was used. In each case the paper layers were mechanically shaved in several steps from a commercially satisfactory board product until there was no paper adhering to the core and the remaining board was accurately weighed. Thereafter, utilizing the same shaving process the first core stratum of 0.005" was removed from each board. The remainder of the intact sample was then accurately weighed to determine the weight of the first core stratum removed. This was then used to calculate the specific gravity of the stratum which had been removed. In this manner the specific gravity of the first stratum was obtained for a number of boards. A similar process was used to obtain the specific gravity of the second and third strata. A number of other strata were then removed from each face of the board core. Finally, the specific gravity of the remaining central portion of the core 14 was obtained. In each case the central portion for which the specific gravity was obtained was approximately 0.3".

The results of these studies are tabulated in FIG. 2. FIG. 2 has been arranged with the first stratum and third stratum at the left hand side with the second stratum at the right hand side of the table. The columns in the centre identifies the thickness and the specific gravity of the central portion.

Boards 1 through 7 were commercially available boards obtained by purchasing acceptable market samples. Except for number 7 two samples were tested from each board. The sample marked 8 is a control sample using a novel foaming agent but not including the improved structure of this invention.

At the lower portion of table 2 test results are provided for the improved board of this invention. It will be observed that the range of specific gravity for the first stratum for the commercially available boards ranged from a low of 0.545 to 0.876 as a high. The corresponding stratum for each of the three examples of the improved board range from 0.984 to a maximum of 1.343. For the third stratum the range of the commercial product was from 0.602 to 0.869. The improved board of this invention showed a range of from 0.716 to 1.102. For the second stratum adjacent to the other face of the board, the commercial product showed a range from 0.539 to 0.824. The corresponding second stratum of the improved board showed a range from 0.963 to 1.210.

Figure 4:
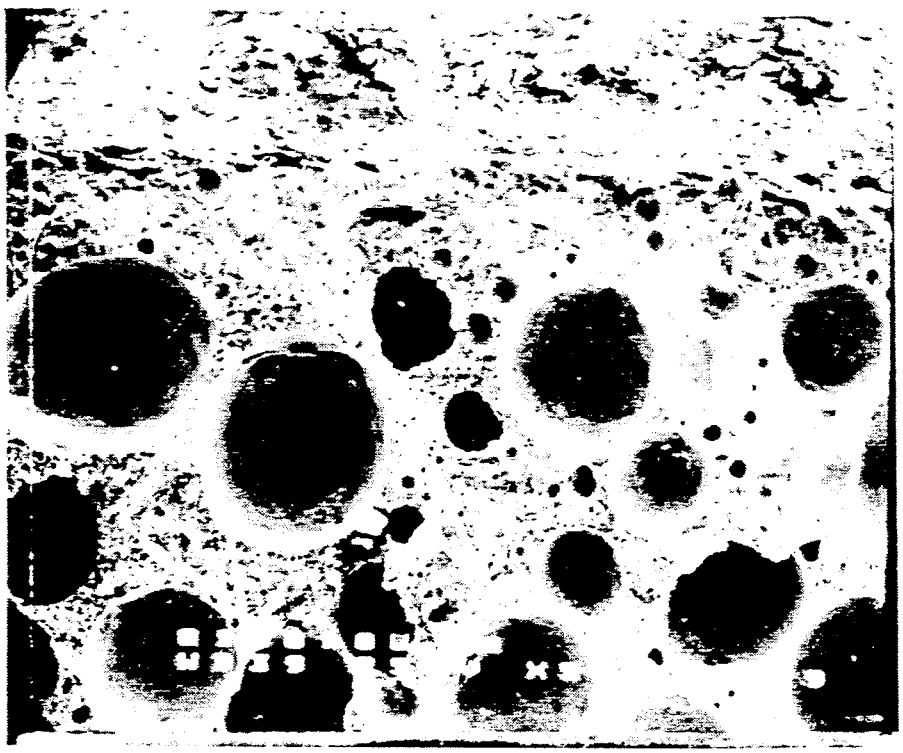
FIG. 4 is a similar photograph of a portion of FIG. 3 at increased magnification.
Figure 5:
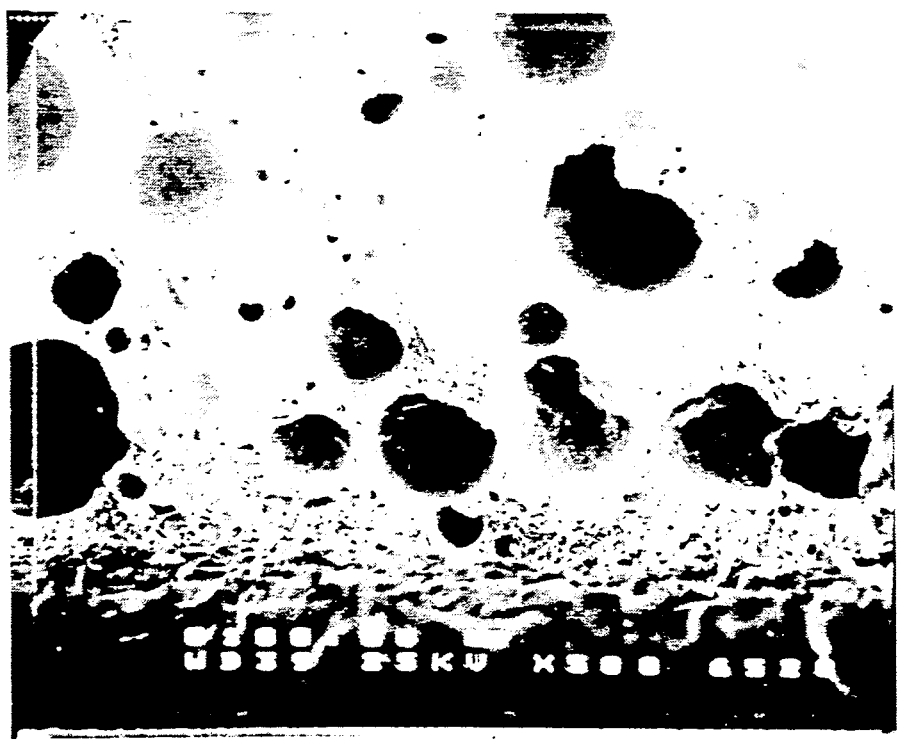
FIG. 5 is a similar photograph of a portion of FIG. 3 at increased magnification.
Figure 7:
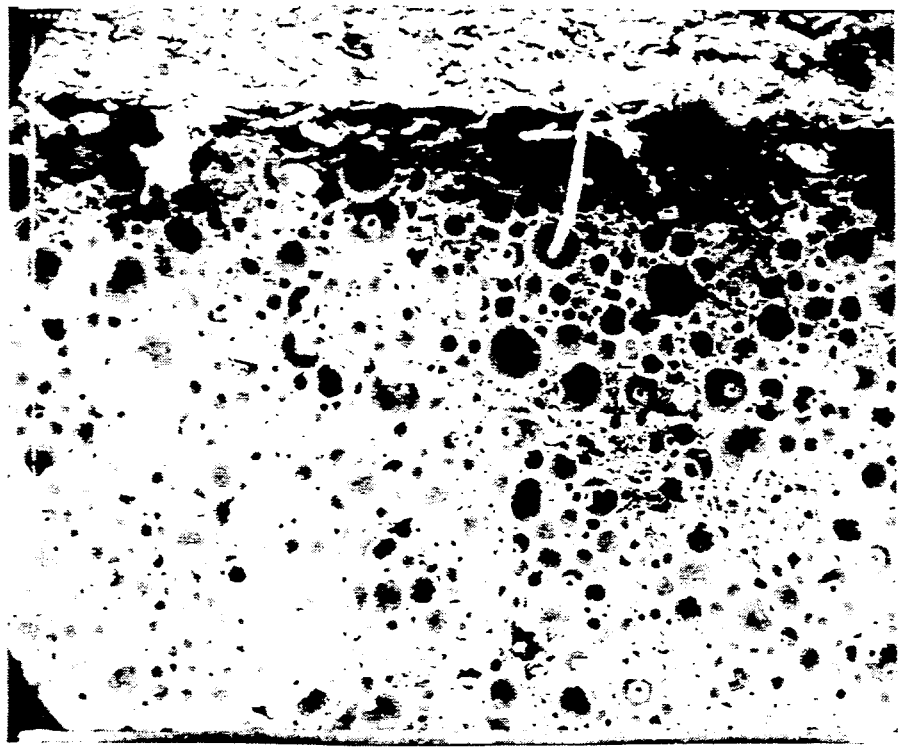

After manufacture of the improved board in accordance with this invention studies of the core were made using scanning electron microscopy of a scored and snapped plane. Photographs taken using this instrument are included as FIGS. 3, 4, and 5 respectively. FIG. 3 illustrates a complete board and both paper faces at 12 times magnification. FIG. 4 is a small area A from FIG. 3 at 50 times magnification. Area A illustrates the first and third stratum adjacent the first paper surface 12. FIG. 4 is of area B at 50 times magnification illustrating the second stratum adjacent the second paper surface.

Figure 6:
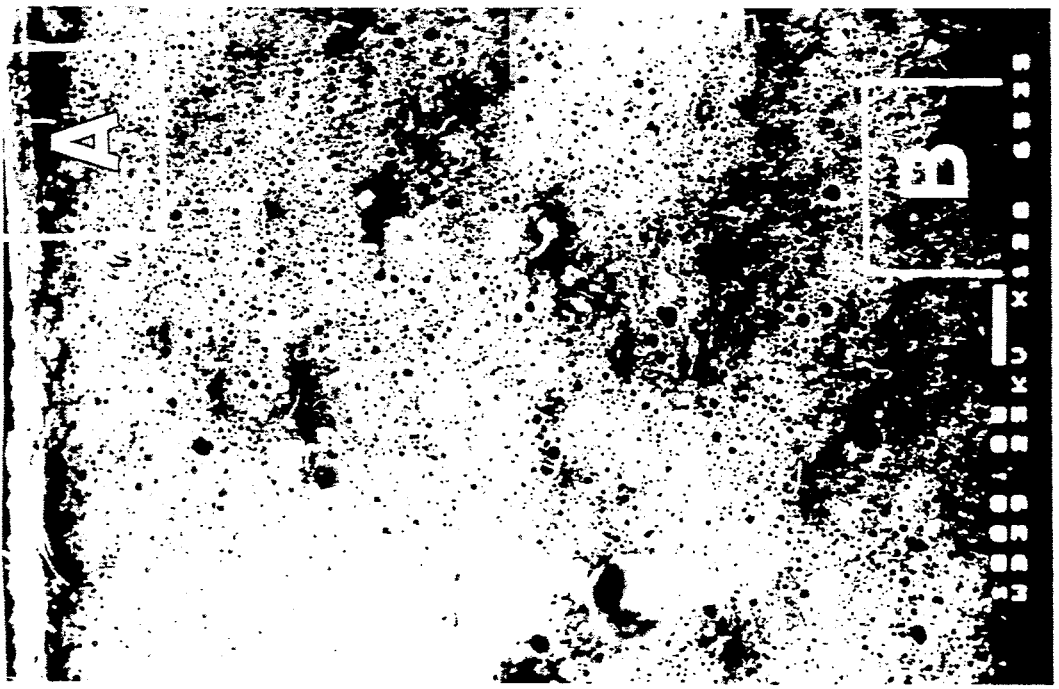
FIG. 6 is a similar photograph comparable to FIG. 3 of a prior art gypsum board.
Figure 7:
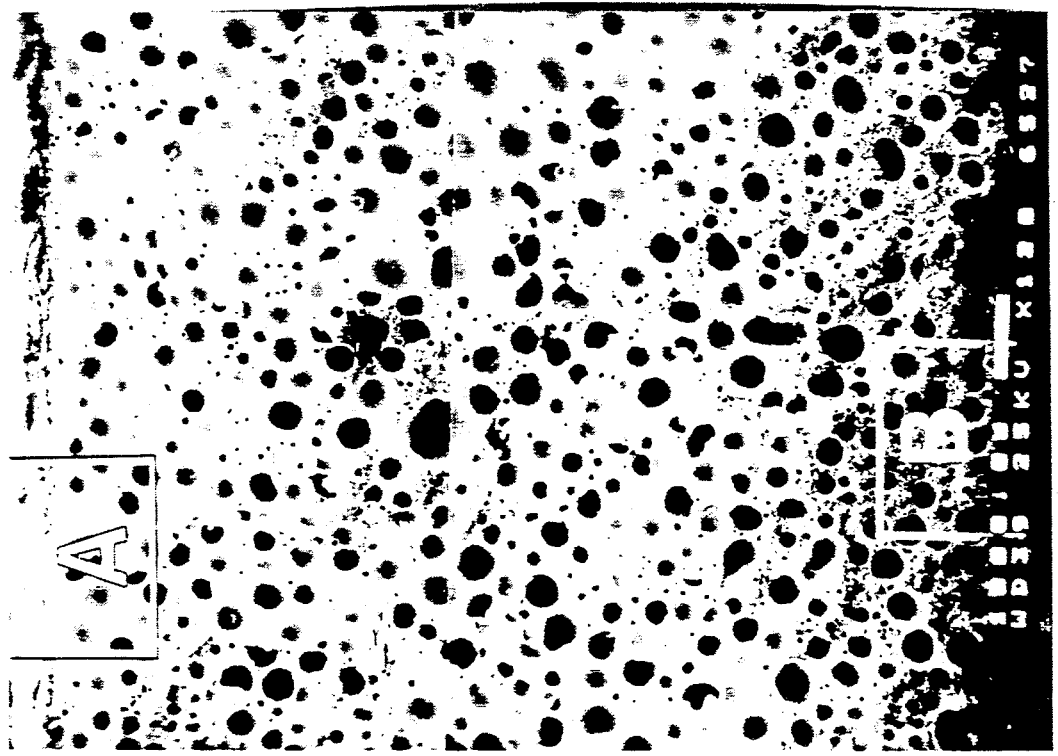
FIG. 7 is a similar photograph of a portion of FIG. 6 at increased magnification.
Figure 8:
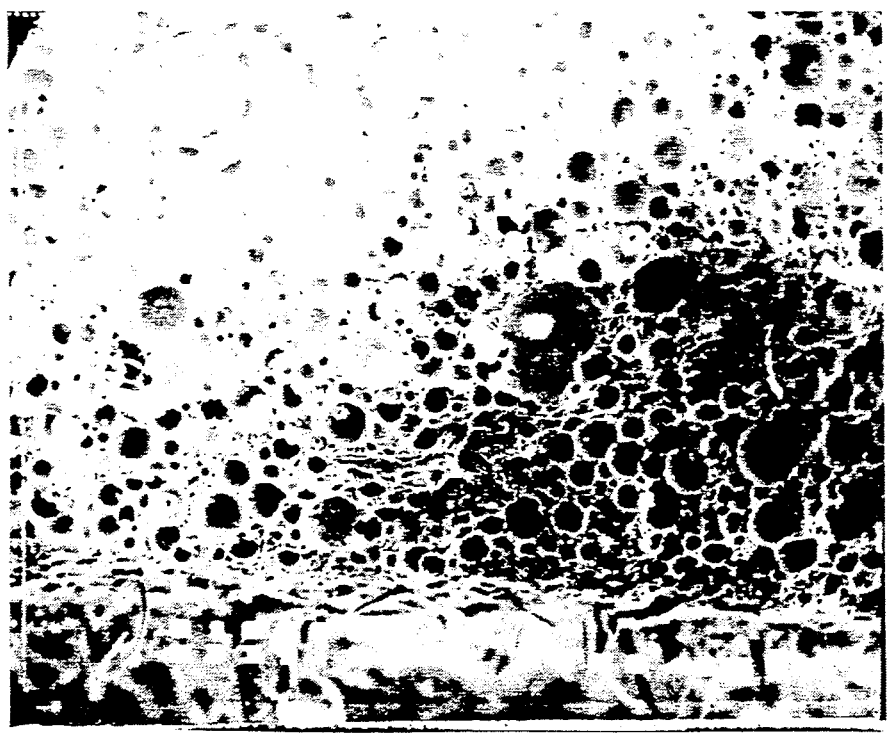
FIG. 8 is a similar photograph of a portion of FIG. 6 at increased magnification.

For comparison purposes similar photographs of a commercially available board of similar magnification show the marked difference which exists between it and the improved board. FIG. 6 compares directly with FIG. 3, while FIGS. 7 and 8 compare directly with FIGS. 4 and 5.

A review of these figures will show that the voids in the improved product are substantially larger than the voids in the existing commercial products. A review of, in particular, FIGS. 7 and 8 will show that the voids in the commercially existing product are relatively closely located adjacent to one another and in many instances the voids extend from one into another. The wall structure between the voids is relatively thin and the voids are themselves nowhere near as substantially spherical shaped as in the improved product. The voids in the prior art board are not coherent and the structure is not discrete.

Further analysis of the photographs provides an indication of the void population.

By counting voids in the photographs, FIGS. 4, 5, 7 and 8 and multiplying by the factor representing the area photographed, the void population per square inch may be obtained. In the conventional product, void population as shown is 68,000 per square inch approximately. By comparison, the void population in the improved product is much less. In the tests illustrated in FIG. 9 the product exhibits population from approximately 3,200 to 6,400 per square inch. Additional testing of improved product made using foam of density 17.9 and 17.7 lbs/cu ft in a different plant gave board having population of 8,500 and 11,000 respectively. This illustrates the significantly larger voids in the improved product. Operating condition and material differences in different plants may give different void populations but void population is substantially less than in prior art products.

The mechanism of board strengthening is not clearly understood, however some very surprising results have been obtained by subjecting the improved board to some of the standard tests used in the industry to evaluate this type of product.

FIG. 9 shows the results from various standardized tests conducted on ½" improved gypsum board and compared to a check specimen. FIG. 9 shows significantly increased nail pull resistance, slurry compressive strength and Hunter hardness results and essentially unchanged flexural strength based upon ASTM standard test methods.

In an industry adopted test, the humidified bond strength is shown to increase with increasing foam density. The results are tabled in FIG. 9. Most significantly, the percent bond failure simultaneously dropped to 0% from a high of 74% for the control sample. At the 0% level there are no "splitter" failures.

The improved gypsum board of this invention may be manufactured using a recently developed foaming agent which is the subject matter of co-pending application Ser. No. 280,454. This foaming agent comprises an alkyl ether sulphate of the formula $CH_3(CH_2)_x CH_2—(OCH_2CH_2)_y—OSO_3M$ wherein at least 90% of x is between 6 and 8 and the average y is between 0.4 and 1.3 and wherein M is a cation producing a water soluble surfactant. Previously, when generating foam for gypsum board from foaming agents the preferred thinking is that the generated foam should have as low a density as possible. We have found with use of the newly developed foaming agent that the improved board of this invention may be manufactured utilizing much higher than normal foam densities. In FIGS. 2 and 9 four different runs are tabulated. The first is the control sample run at 7.0 lbs/cu ft foam density. In the second run the foam was generated with a density of 10.4 lbs/cu ft. In the third run the foam had a density of 13.0 lb/cu ft and in the fourth run the foam had a density of 14.5 lb/cu ft. It will be observed from the table that a significant increase in the specific gravity of the first, second and third strata occurs at foam densities of 10.4 lb/cu ft and higher.

Figure 10:
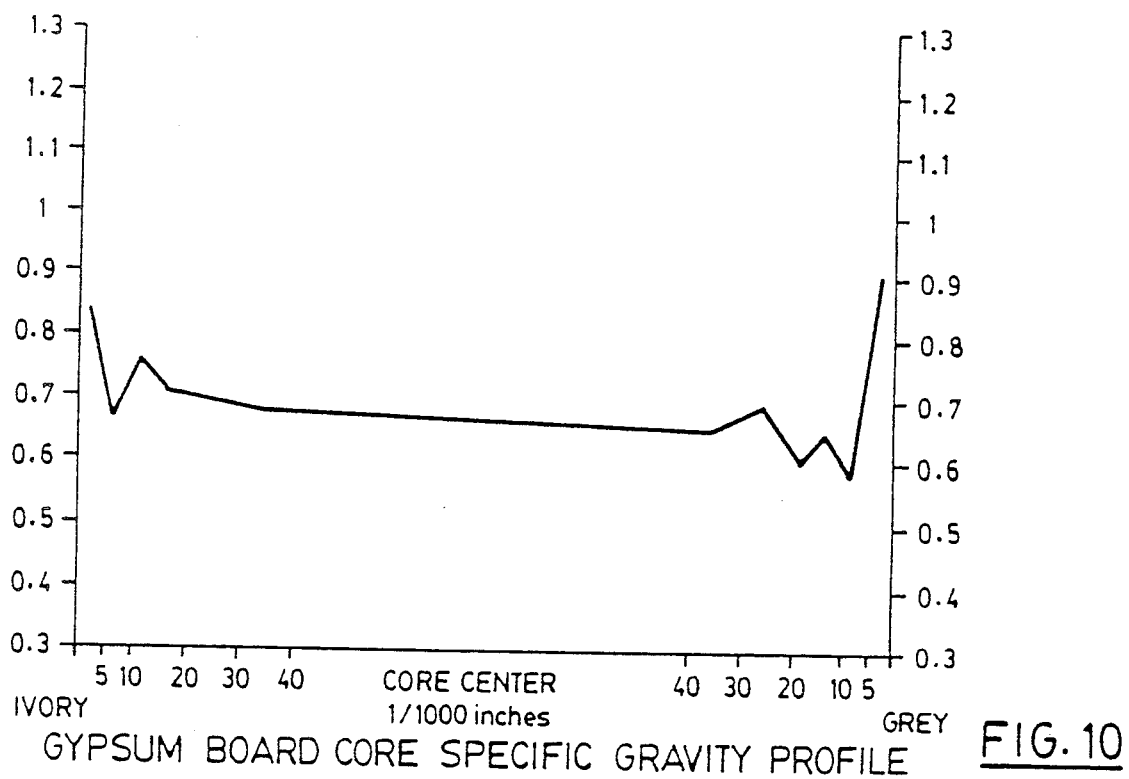
FIG. 10 is a plot of specific gravity profile for gypsum board made with a novel foaming agent but not involving the improved structure.

FIG. 10 shows the core specific gravity profile for the control sample.

Figure 11:
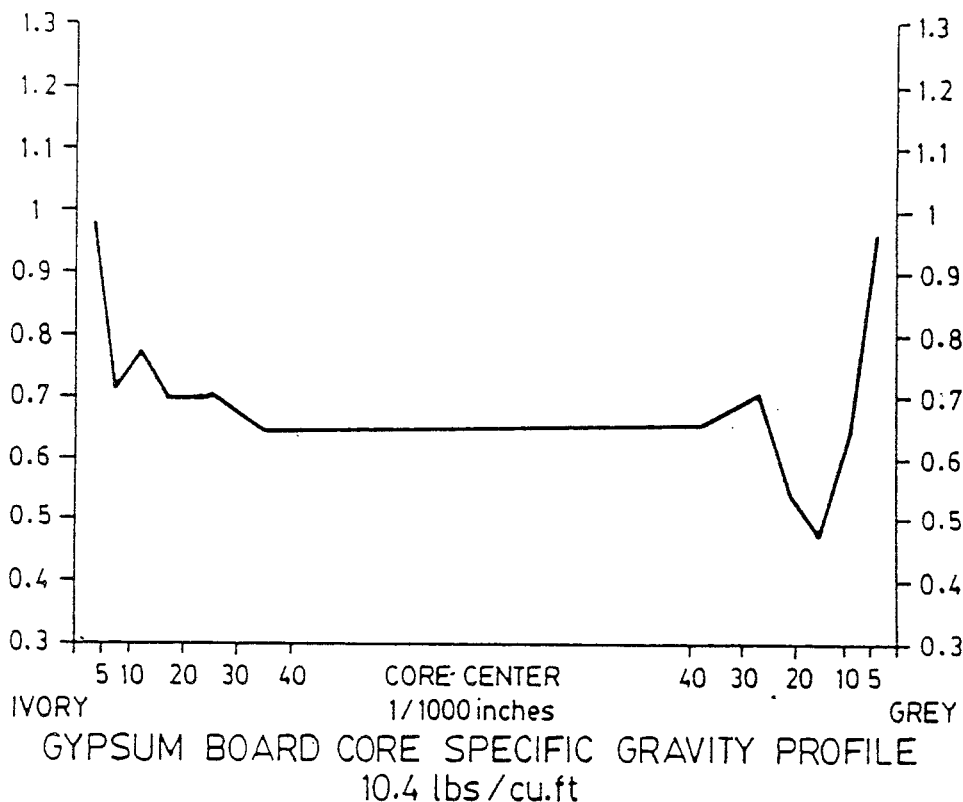
FIG. 11 is a plot of specific gravity profile for a board in accordance with this invention made with foam having a density of 10.4 lbs/cu ft.
Figure 12:
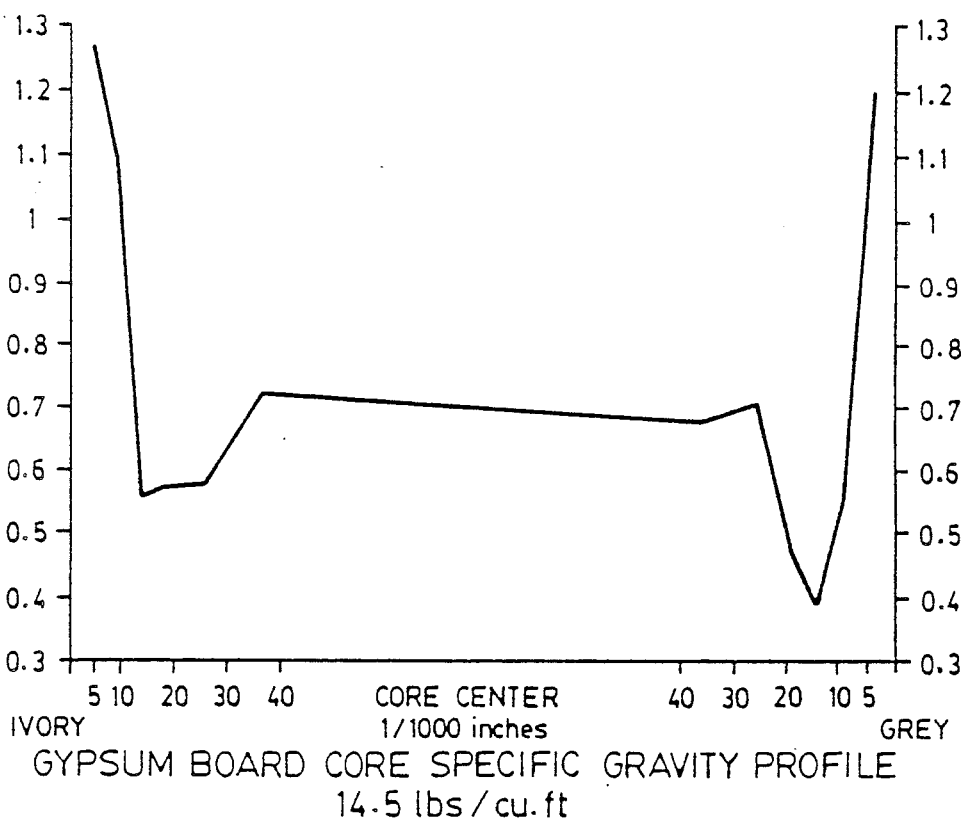
FIG. 12 is a plot of specific gravity profile for a board in accordance with this invention made with foam having a density of 14.5 lbs/cu ft.
Figure 13:
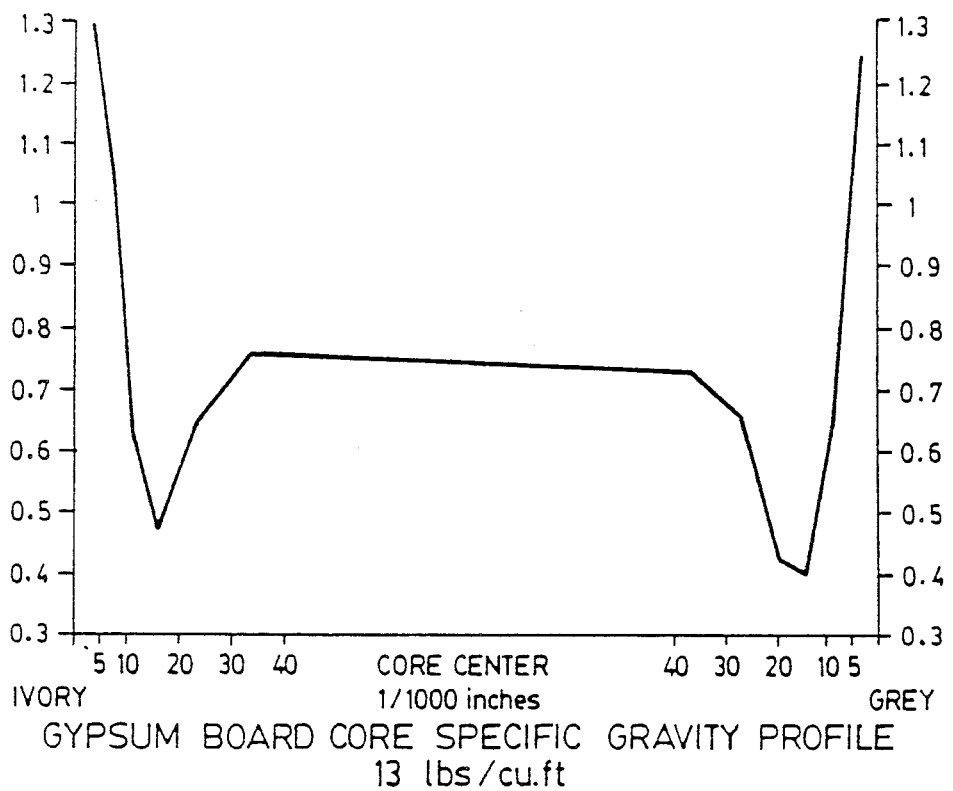
FIG. 13 is a plot of specific gravity profile for a board in accordance with this invention made with foam having a density of 13 lbs/cu ft.
Figure 14:
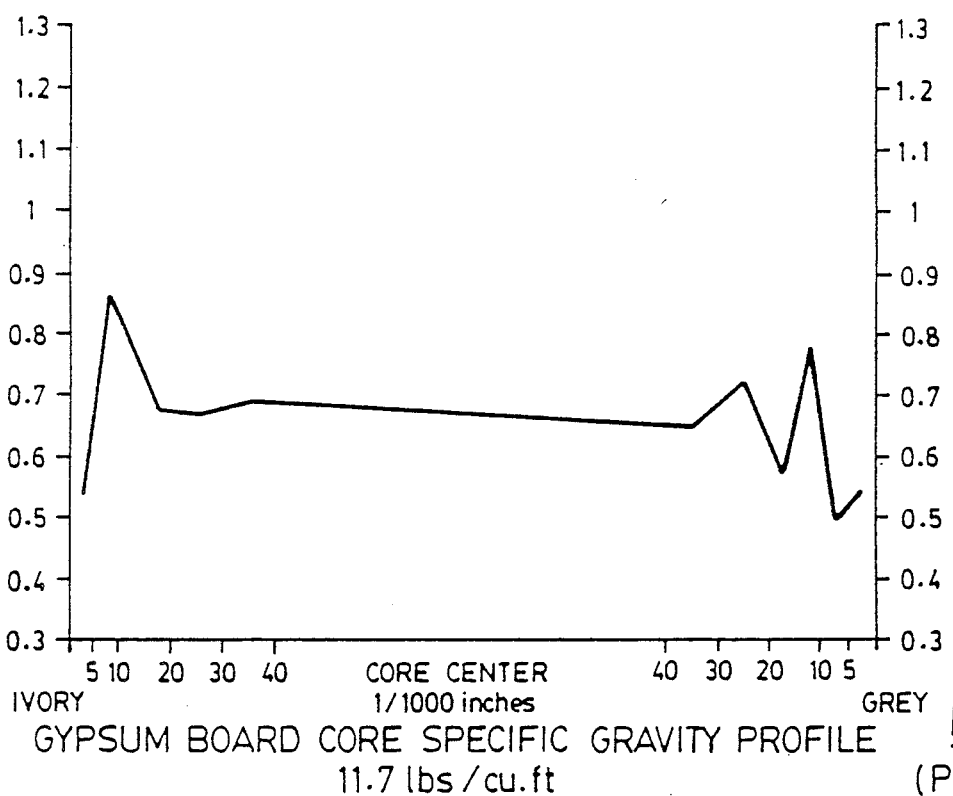
FIG. 14 is a plot of specific gravity profile for a prior art board made with foam having a density of 11.7 lbs/cu ft.
Figure 15:
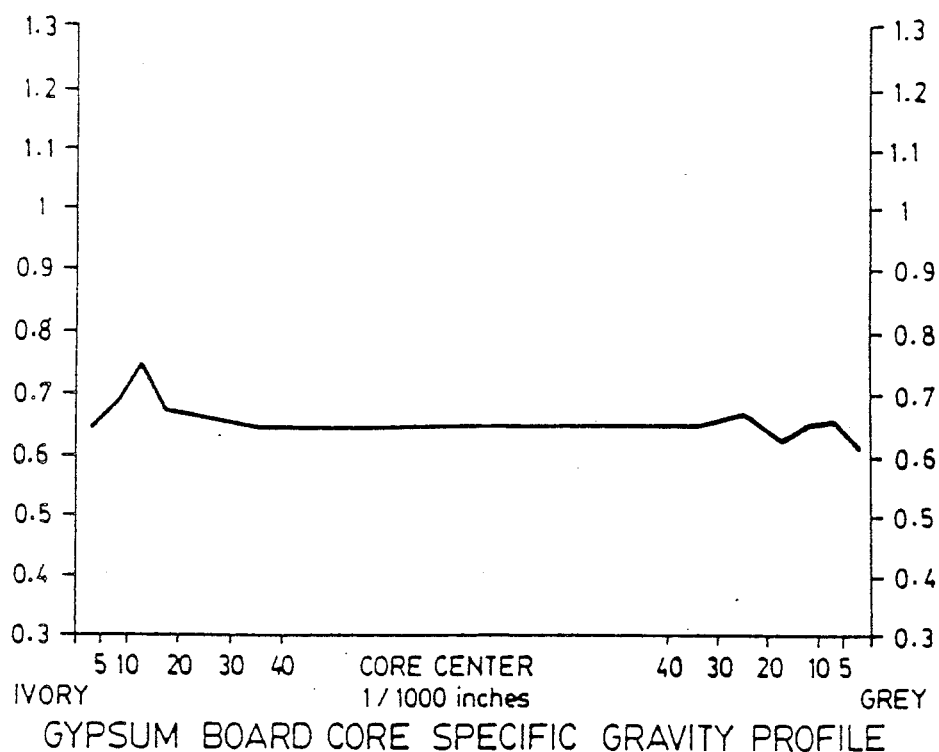
FIG. 15 is a plot of specific gravity profile for a prior art board made with foam having a density of 8.9 lbs/cu ft.
Figure 16:
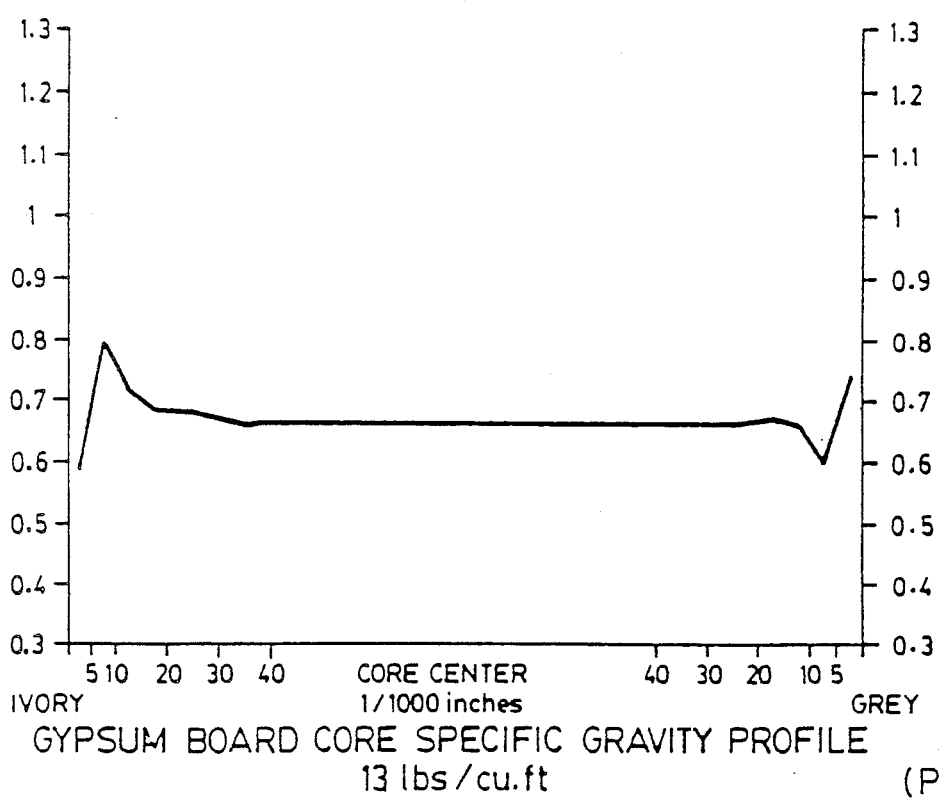
FIG. 16 is a plot of specific gravity profile for a prior art board made with foam having a density of 13 lbs/cu ft.

FIGS. 11, 12 and 13 show the core specific gravity profile of the improved board made at foam densities of 10.4, 14.5 and 13 lbs/cu ft respectively. FIGS. 14, 15 and 16 show the core specific gravity profile for a previously available commercial board made with foam densities of 11.7, 8.9 and 13 lbs/cu ft respectively. Comparison of these figures shows the increased specific gravity of the first, second and third strata of the improved board as compared to the previous product. In the improved board, the specific gravity of the first and third strata is at least 0.95 and preferably at least 1.1.

The improved product can be manufactured using conventional gypsum board manufacturing equipment, calcined gypsum, usually referred to as stucco, prepared by calcining raw gypsum in a number of alternate ways according to good commercial practice well known to the art, to form calcium sulfate hemihydrate (stucco), and the foaming agent specified above.

Figure 17:
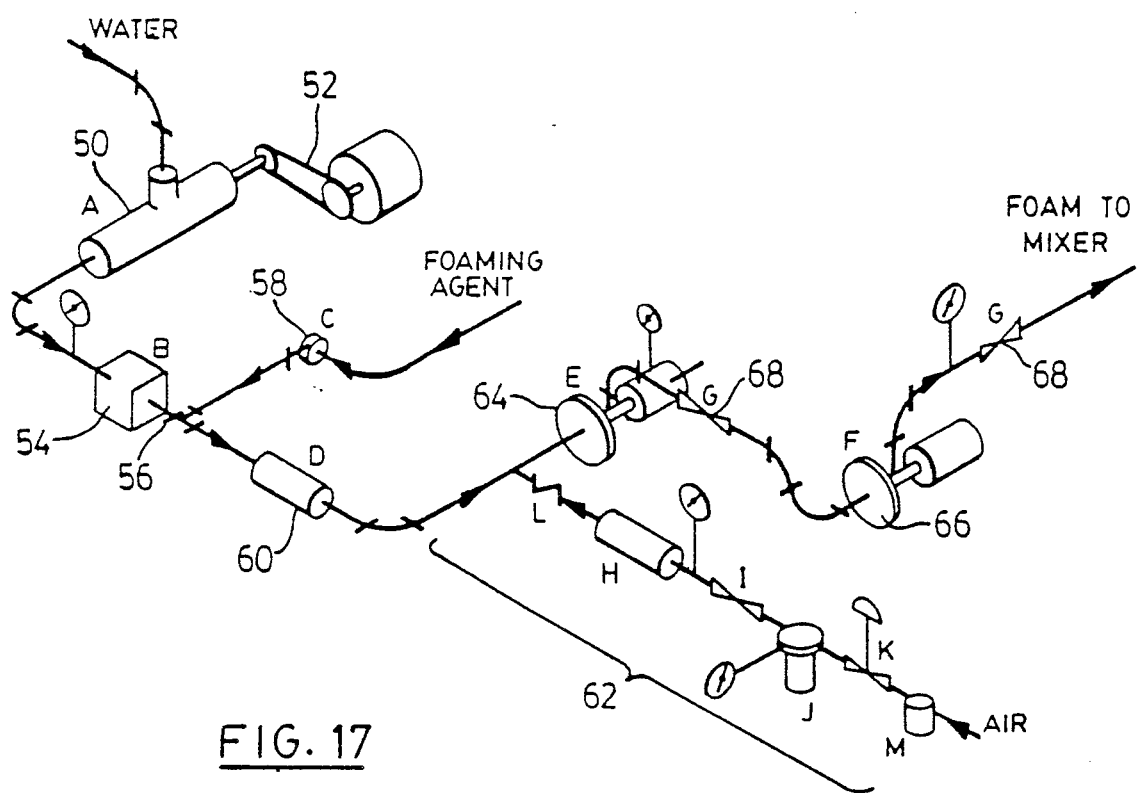
FIG. 17 is a schematic diagram showing suitable apparatus to generate foam for the manufacture of board in accordance with the invention.

FIG. 17 illustrates a typical gypsum board foam generating apparatus, which consists of a positive displacement pump 50 with a variable speed drive 52, controlled by a magnetic flow meter 54 to accurately feed water to the board making apparatus. Liquid foaming agent concentrate, as supplied by the supplier, is accurately fed into the water feed line 56 by a gear pump 58 just prior to a static mixer 60 which produces a homogenous diluted foam liquid. Air to produce the voids in the foam structure is metered via a series or valves and regulators 62 into the diluted foam liquid, just prior to the inlet to first foam generator 64. The partially generated foam passes through a second foam generator 66, after which the foam is fed to a typical gypsum board core slurry mixer. Foam generators 64 and 66 are centrifugal pumps readily available from a number of suppliers. We have found Crane Deming pump #4011 with a 9" diameter semi-open impeller driven by a 3600 rpm motor, to work fully satisfactory in gypsum board plants running over a wide range of belt line speeds. Those familiar with the art will use control valves 68 after both foam generating pumps to vary the back pressures in the system to establish steady running conditions for the foam generator, consistent with the flow rates of the foam-water mix, foam concentrate and air, while generating foam of the desired density. The sizes of the various motors used in the system will be dependent on the material flow rates and pressures, which, in turn will be a function of the maximum design speed of the gypsum board line. The improved board of the invention illustrated in the examples has been made using foam of 10 lb/cu ft or more. In addition, to achieve the improved product of this invention at least 35% of the total water used in the gypsum board core slurry formulation must pass through the foam generating system.

The pregenerated foam is continuously fed into the top circular lid of a typical mechanical slurry mixer along with the stucco, additional water and all other dry and wet ingredients which make up the board core formulation. The location of the various additive inlets on the lid may vary from plant to plant. A typical slurry mixer, well known to the art, consists of an internal bottom rotor and fixed top stator with intermeshing pins radially spaced on their surfaces between which the core ingredients become intimately mixed into a homogenous slurry due to the vigorous action of the rotor.

The board core slurry is discharged from the bottom of such a "pin" mixer along its outer circumference via one or more flexible "boots" onto a bottom paper sheet supported by a continuous moving flat rubber belt. The edges of the bottom paper sheet are folded upwards to form paper covered edges in the finished board, and, as the belt passes into a forming station, which determines the finished board thickness, a second paper sheet is laid on top to fully enclose the core and establish the finished board width. As the formed board passes along the moving belt, the core slurry hardens, "sets", or hydrates to gypsum in a controlled manner well known to the trade, such that it will develop sufficient wet strength to allow it to be carried on a short roller section prior to a continuous rotary knife which is synchronised with the line speed to cut individual boards to the desired length. The individual boards are then strong enough to be transferred to a multiple deck tunnel kiln, or dryer to remove the free water in the core in the manner used in typical gypsum board manufacturing facilities.

In describing the preferred embodiment illustrated, reference has been made to the paper surfaces 12 and 16. This invention is not limited to gypsum board having such paper surfaces. The invention is also applicable to gypsum board having other fibrous surfaces and also to specialized gypsum board such as fire rated board, sheathing board, moisture resistant board and the like.

Various other changes to the invention may be made without departing from the spirit of the invention as defined in the following claims.

We claim:

1. Wallboards, suitable for use in constructing interior walls and ceilings of buildings, comprising:
    (1) a core of foamed gypsum with a multiplicity of relatively large voids substantially uniformly distributed therethrough and having a first specific gravity, said core having a void population of not greater than 11,000 voids per square inch of surface area of a plane formed by scoring and snapping said board, said core having top and bottom surfaces, with the top and bottom surfaces being substantially parallel to each other;
    (2) fibrous material cover sheets disposed on and in substantially the entire top and bottom surfaces, wherein first and other interfaces between the fibrous material cover sheets and the top and bottom surfaces of the gypsum core are established and wherein the interfaces are a mixture of fibers from the cover sheets and gypsum from the core; and
    (3) a first stratum of the gypsum core wherein said first stratum does not contain any substantial number of voids, has a specific gravity of at least 0.95, has a specific gravity significantly greater than said first specific gravity and is disposed substantially parallel to and substantially next to the first interface, but spaced from said interface a distance sufficient that fibers of said cover sheet disposed in said interface do not substantially protrude into said stratum and said stratum is substantially free from said fibers.

2. The gypsum board of claim 1, wherein said core has a second stratum which is essentially the same as the said first stratum and is disposed adjacent to the other interface in the same manner as the said spacing of the first stratum from the first interface.

3. The gypsum board of claim 2, wherein said core has a third stratum adjacent said first stratum, said third stratum having a specific gravity substantially greater than the central portion of the core but less than the specific gravity of said first stratum.

4. The board of claim 1, wherein said first stratum is about 0.005 inch in thickness.

5. The board of claim 2, wherein said second stratum is about 0.005 inch in thickness.

6. The board of claim 1, wherein said first stratum has a specific gravity of at least 1.1.

7. The board of claim 2, wherein said first stratum has a specific gravity of at least 1.1.

8. The board of claim 2, wherein said second stratum has a specific gravity of at least 1.1.

9. The board of claim 7, wherein said second stratum has a specific gravity of at least 1.1.

10. The board of claim 3, wherein said first stratum has a specific gravity of at least 1.1 and said third stratum has a specific gravity of at least 0.7.

11. The board of claim 10, wherein said third stratum has a specific gravity of at least 0.7.

12. The board of claim 10, wherein said second stratum has a specific gravity of at least 1.1.

13. The board of claim 11, wherein said second stratum has a specific gravity of at least 1.1.

* * * * *

UNITED STATES PATENT AND TRADEMARK OFFICE
CERTIFICATE OF CORRECTION

PATENT NO. : 5,116,671

DATED : May 26, 1992

INVENTOR(S) : ROBERT BRUCE and DIMITRIOS MITAKIDIS

It is certified that error appears in the above-identified patent and that said Letters Patent is hereby corrected as shown below:

Column 8, line 63, second line thereof, change "0.7" to --1.0--.

Signed and Sealed this

Fourteenth Day of September, 1993

Attest:

BRUCE LEHMAN

Attesting Officer

Commissioner of Patents and Trademarks